July 9, 1963 M. E. BOURNS Re. 25,412

ELECTRICAL RESISTOR

Original Filed July 5, 1955

INVENTOR.
MARLAN E. BOURNS
BY Lyon & Lyon
ATTORNEYS.

United States Patent Office

Re. 25,412
Reissued July 9, 1963

25,412
ELECTRICAL RESISTOR

Marlan E. Bourns, 2530 Piedmont Drive,
Riverside, Calif.

Original No. 2,989,718, dated June 20, 1961, Ser. No. 839,767, Sept. 14, 1959, which is a division of Ser. No. 519,847, July 5, 1955. Application for reissue May 3, 1962, Ser. No. 193,650
12 Claims. (Cl. 338—150)

Matter enclosed in heavy brackets [ ] appears in the original patent but forms no part of this reissue specification; matter printed in italics indicates the additions made by reissue.

The present invention relates to new and improved electrical components and is a division of my pending application Serial No. 519,847, filed July 5, 1955, entitled, "Electrical Resistor" (as amended by Examiner) and now abandoned. More specifically, it relates to new and improved electrical potentiometers and like devices.

A great many organizations at the present time are devoting considerable time and money to the development of various electrical or electronic devices which consist primarily of a number of separate electrical components secured together in a compact assembly capable of being used as an integral unit in a large device, such as for example, a computer or the like. One particular effort along these lines has been financed to a large extent by the United States Air Force and is commonly termed, "Project Tinker Toy." In this Tinker Toy Project, the electrical components utilized are in the form of small flat squares approximately ¾ of an inch in length along each edge and of varying thickness. Each of the components in this type of a structure is secured within an elongated cage consisting of 12 wires, three of which are disposed along each edge of each component. All of the wires used are located parallel to one another. At times, less than twelve wires are employed, and discontinuous wires are employed in order to make or complete a desired electrical circuit.

As nearly as is known at the preesnt time, no potentiometers or like electrical components of essentially an adjustable nature have been developed which are capable of being used satisfactorily in the so-called Tinker Toy Project. It is a broad object of this invention to provide adjustable potentiometers and resistors which can be satisfactorily utilized in the so-called Tinker Toy type of construction. Another object of the instant invention is to provide adjustable electrical components of the class described which are capable of wide use in other diverse applications and which may be easily manufactured with a minimum of difficulty. A further object of this invention is to provide small electrical components of the category indicated which are rugged so that they are capable of standing a large amount of abuse. Another object of this disclosure is to teach the manufacture and construction of potentiometers and the like which may be directly secured to various wires in an electrical circuit, and which may be supported in a desired position by these wires.

Further objects of this disclosure as well as many other advantages of the constructions described herein will be apparent from the remainder of this description, including the appended claims and the accompanying drawings in which:

It is to be understood that the accompanying drawings are not scaled to any particular commercial unit but are designed merely to illustrate the essential, preferred features of the present invention. Wherever convenient for purposes of illustration and explanation, like numerals have been utilized to designate like parts.

The present invention is defined in detail by the appended claims forming a part of the specification. The invention may be briefly summarized as being primarily concerned with new and improved electrical instruments or components which include: a housing; means defining a disc shaped cavity within said housing; first and second electrical means disposed within said cavity; a movable member located within said cavity; means for rotating said movable member within said cavity, said means projecting to the exterior of said housing and being located at one side of said cavity; means attached to said movable member for electrically connecting said first and second electrical means; and means for connecting said first and second electrical means into an electrical circuit, said means being electrically connected to said first and second electrical means and projecting to the exterior of said housing.

Figure 1:
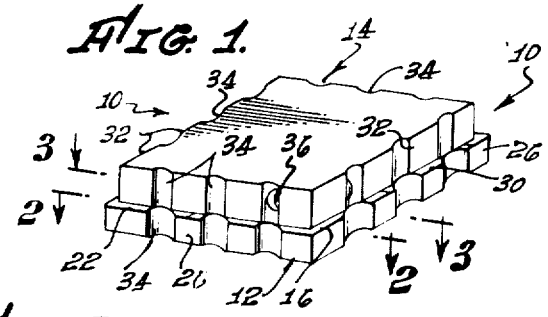
FIG. 1 is an isometric view of a potentiometer of the present invention.
Figure 2:
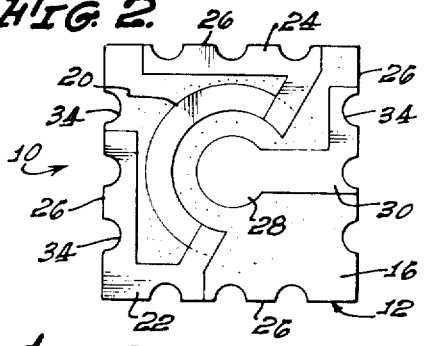
FIG. 2 is a cross sectional view taken at line 2—2 of FIG. 1.
Figure 3:
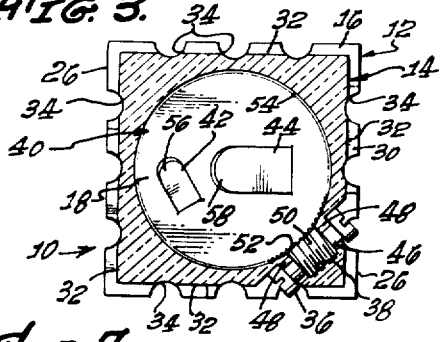
FIG. 3 is a cross sectional view taken at line 3—3 of FIG. 1.

The details of the invention are best explained directly by reference to the accompanying drawings. In FIGS. 1 through 3 of the drawings there is shown an adjustable potentiometer 10 according to the invention, which includes a base 12 and a cover 14 positioned upon this base. It is to be noted that both the base 12 and the cover 14 are of roughly the same exterior shape similar to a small square wafer and that the exterior dimensions of the cover 14 are smaller than the exterior dimensions of the base 12 so that part of the upper surface 16 of the base 12 is exposed when the cover is located on it. The base 12 and the cover 14 are preferably formed out of a non-conductive material such as, for example, a suitable phenolic material or a dielectric ceramic. These two members are secured together by suitable conventional means such as, for example, an adhesive, so as to define a housing or casing providing an internal cavity 18 of disc like shape between them.

The upper surface 16 of the base 12 is flat and bears thereon an arcuate or C-shaped resistive element in the form of a resistance strip 20 formed of appropriate conventional material such as, for example, a resistive ink. The ends of this resistance strip are overlaid by parts of terminals 22 and 24. These terminals are preferably formed of a silver ink or the like and extend from the resistance strip 20 to adjacent edges 26 of the base 12 so that they may be readily connected to various wires or other means used to electrically connect the potentiometer 10 into a circuit. Wtihin the center of the arcuate resistance strip 20 there is located upon the upper surface 16 a circular end 28 of a terminal 30 providing an electrical return which is similar to the terminals 22 and 24 and which projects to adjacent edge 26 of the base 12.

Figure 4:
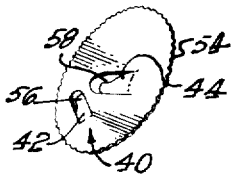
FIG. 4 is an isometric view of a member utilized in the potentiometer shown in FIG. 1.

Disposed along the edges 26 of the base 12 and edges 32 of the cover 14 are a series of grooves 34 which are specifically designed to hold the various wires such as, for example, wires employed in the so-called Tinker Toy type of construction when the potentiometer 10 is mounted in this type of an assembly. With this construction the various terminals 22, 24, and 30 may be secured directly to these wires by solder or other like means as desired. A screw-threaded means in the form of a worm or double headed screw 36 is disposed within a slot 38 formed in the lower face of the cover 14. Screw 36 is constructed and arranged to rotate a disc 40 located within the cavity 18 as the screw is turned. Disc 40 is provided with resilient contacts 42 and 44 constructed and arranged for engagement with the resistance strip 20 and with the circular end 28 of the terminal 30. This construction is best understood with reference to FIGS. 3 and 4 of the drawings.

The screw 36 is provided with annular grooves 46 which are designed to be engaged by projections 48 formed upon the cover 14 projecting into the slot 38, so as to hold this screw in position with the threads 50 on it projecting a short distance through an opening 52 in the cover 14 connecting the slot 38 and the cavity 18. Thus, with this construction the threads 50 are located within the cover 14 so as to engage gear teeth 54 formed on the periphery of the disc 40. The contacts 42 and 44 (FIG. 4) are preferably formed integral with the disc 40 by a simple punching operation, and so as to include ends 56 and 58, respectively, which are designed to engage the resistance strip 20 and the circular end 28. The disc 40 is preferably formed out of a comparatively strong resilient metal such as, for example, brass, and is of such dimensions as to fit closely within the cavity 18. The contact 44 normally holds this disc 40 in a desired position within the cavity 18, parallel to the surface 16. The screw 36 is preferably formed out of a non-conductive material such as nylon or the like.

Figure 5:
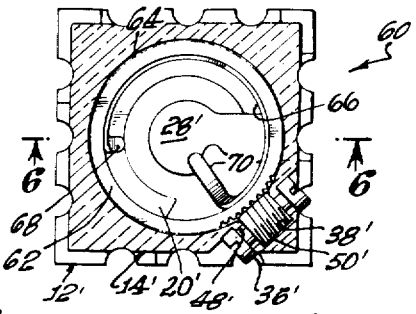
FIG. 5 is a view similar to FIG. 3 of a modified potentiometer of the invention.

In FIG. 5 of the drawings a modified potentiometer 60 according to the invention is shown, which differs from the potentiometer 10 in that the disc 40 previously described is replaced by a ring 62 having gear teeth 64 similar to the teeth 54, formed on the outer periphery thereof. Within this ring is disposed a resilient metal contact element or ring 66 of curved, partially circular, shape, having formed thereon resilient contact arms 68 and 70 arranged to engage a resistance strip 20' and a circular end 28'. With this construction the contact ring 66 is preferably larger than a semicircle, so that it may be easily held in position within the ring 62 by spring tension. If desired, the contact ring 66 may be secured to the ring 62 by the use of rivets or an adhesive. The ring 62 may be formed either out of metal or of a non-conductive material such as, for example, phenolic resin. In the latter and preferred case it is possible to form the actuating screw, 36', of metal.

Figure 6:
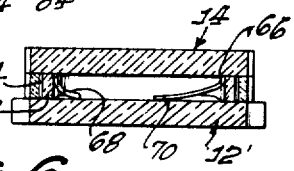
FIG. 6 is a cross sectional view taken at line 6—6 of FIG. 5.

Those skilled in the art will realize that those parts of the potentiometer 60 which are substantially similar to various parts of the potentiometer 10 previously described, are identified in FIGS. 5 and 6 of the drawings by the primes of numerals used earlier in this description.

Figure 8:
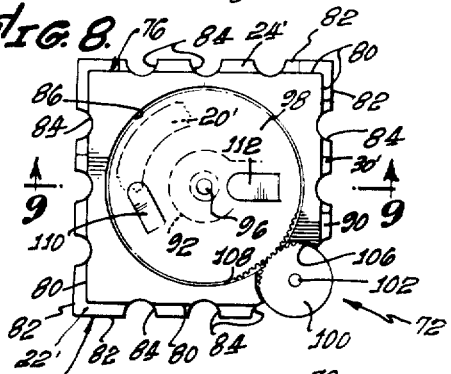
FIG. 8 is a cross sectional view taken at line 8—8 of FIG. 7.
Figure 7:
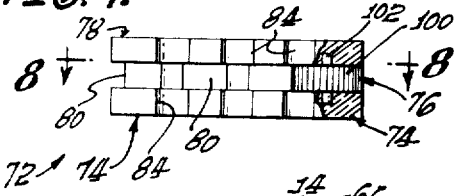
FIG. 7 is a side view of a second modified potentiometer of the invention.
Figure 9:
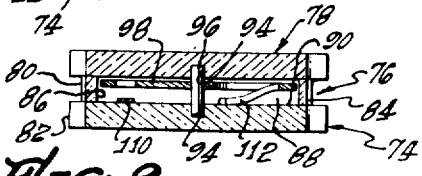
FIG. 9 is a cross sectional view taken at line 9—9 of FIG. 8.

In FIGS. 7, 8, and 9 of the drawings a second modified potentiometer according to the invention is illustrated. That potentiometer, 72, includes a base 74, a spacer 76 and a cover 78. All of these three members are preferably formed of a non-conductive material such as, for example, a ceramic or a phenolic resin, in such a manner that the edges 80 of the spacer 76 are shorter than the edges 82 of the base 74 and the cover 78. Appropriate grooves or notches 84, similar to the grooves 34 previously described, are provided in the edges 80 and 82 for the same purpose as the grooves 34. The base 74, spacer 76 and the cover 78 may be secured together in any convenient manner such as, for example, by an adhesive or rivets, so as to form a composite sandwich-like construction as illustrated.

Within the spacer 76 there is located a circular opening 86 which in the sandwich-like construction serves to define together with the base 74 and the cover 78 a cavity 88 similar to the cavity 18 previously described. On the top surface 90 of the base 74 there is provided a resistance strip 20' similar to the resistance strip 20 and terminals 22' and 24' similar to the terminals 22 and 24 previously described, and a terminal 30' similar to the terminal 30 previously described. Terminal 30' includes a ring shaped end 92 located so as to be concentrically located with respect to the axis of strip 20'.

Within the base 74 and the cover 78 there are located aligned cylindrical holes 94 which are designed to carry a pin 96 serving as a shaft, whereby a metal disc 93 attached to this pin by solder or the like may be rotated about this pin through the operation of a small gear 100. The gear 100 is mounted upon a pin 102 located within aligned holes in the base 74 and the cover 78 as indicated in FIG. 7, so as to be held normally within an opening 106 in the spacer 76 and so that the teeth of the gear 100 can coact with gear teeth 108 formed on the periphery of the disc 98. As indicated gear 100 is at one side of the cavity 88. Contacts 110 and 112 are formed on the disc 98 in a manner similar to that in which the contacts 42 and 44 are formed on the disc 40, and these contacts are arranged to engage the resistance strip 20' and the end 98 of the terminal 30'. The electrical conductor means employed on the base 74 are similar to those used in the potentiometer 60.

Those skilled in the art will realize both the modified forms of potentiometers, 60 and 72, can be connected to electrical circuits by various wires in essentially the same manner as described for the potentiometer 10. All of these three different constructions are quite advantageous inasmuch as with them quite fine adjustment is possible through the use of what amounts to gear reduction means comprised in the discs 40, 40', and 98 and the screws 36, 36' and the gear 100. These constructions are quite advantageous for assembly in complex electrical assemblies such as those of the so-called Tinker Toy Project type inasmuch as the means used to adjust them are relatively small and are located in such a manner as not to interfere to any material extent with the complete assembly. Further, all of the potentiometers 10, 60 and 72 are very thin, small devices which are quite reliable in use and which can be quite easily constructed utilizing established techniques.

Obviously a number of changes may be made in this invention without departing from the essential features of it. As an example of such changes, the sandwich type of construction illustrated in FIGS. 7, 8, and 9 of the drawings could be utilized in forming the potentiometers 10 and 60. Further, the ring type of construction shown in FIG. 5 of the drawings may be utilized together with a small drive gear such as the gear 100. All such modifications are considered to be part of the present invention insofar as they are defined in the appended claims.

I claim:

1. A new and improved variable resistor which includes: a housing including means defining a cavity within said housing; an electrical resistance member disposed within said cavity, and an electrical return means for said resistance member disposed within said cavity; a movable ring seated within said cavity; a screw carried by said housing adapted to move said ring, said screw projecting to the exterior of said housing and being located at one side of said cavity; means, supported by said ring, for electrically connecting said electrical resistance member and electrical return means; and means for connecting said electrical resistance member and electrical return means into an electrical circuit.

2. A new and improved electrical instrument which includes: a non-conductive base having a recess; conductive means serving as an electrical return mounted on said base; an electrical resistance member mounted upon said base; a ring gear seated for rotation in said recess, adjacent to said conductive means and said resistance member; rotatable toothed means carried by said base, engaged with said ring gear for rotating the gear; a resilient metal contact member of partially circular shape having a contact arm engaging said resistance member, said contact member being positioned within said ring gear; and means for connecting said conductive means and said resistance member into an electrical circuit.

3. A new and improved potentiometer which includes: a base; a conductive means constructed and arranged as an electrical return, mounted on said base, an arcuate electrical resistance element positioned upon said base; electrical terminals on said base, certain ones of said electrical terminals being in electrical communication with the ends of said arcuate resistance element; a cover on said base, said cover including an opening formed therein so as to define an internal cavity between said cover and said base; a ring having gear teeth formed on the outer periphery thereof, seated for rotation in said cavity; a resilient curved contact element positioned within said ring; contact means on said contact element, engaging said arcuate resistance strip and said conductive means; means defining a slot within said cover; and a screw located within said slot, the threads of said screw engaging said gear teeth on said ring, whereby when said screw is turned, said ring is rotated in said cavity and a contact means of said contact element is moved along said resistance strip.

4. A new and improved potentiometer which includes: a base; conductive means arranged as an electrical return mounted on said base; an arcuate electrical resistance strip positioned upon said base; electrical terminals on said base, said electrical terminals being in electrical communication with end portions of said arcuate resistance strip; a cover positioned upon said base, said cover comprising means defining a slot therein, and including an opening formed therein so as to define an internal cavity between said cover and said base; a ring having gear teeth formed on the outer periphery thereof, seated within said cavity; a resilient curved contact element positioned and frictionally held within said ring, said contact element comprising contact means engaging said arcuate resistance strip and said conductive means and a screw located within said slot, the threads of said screw engaging said gear teeth on said ring whereby when said screw is turned, said ring is rotated in said cavity and a contact means of said contact element is moved along and in contact with said resistance strip.

5. A new and improved potentiometer which includes: a non-conductive base; conductive means serving as an electrical return, said conductive means including a portion centrally positioned upon said base; an arcuate electrical resistance strip mounted on said base concentric with said centrally positioned portion; electrical terminals positioned upon said base, said electrical terminals being in electrical communication with end portions of said arcuate resistance strip; a cover positioned upon said base, said cover including means defining a slot therein and also having an opening formed therein so as to define an internal cavity between said cover and said base, a first ring having gear teeth formed on the outer periphery thereof seated within and confined to said cavity by said cover; a resilient partially circular contact ring positioned within said first ring said contact ring having contact means engaging said arcuate resistance strip and said conductive means; and a screw located within said slot, the threads of said screw engaging said gear teeth on said first ring whereby when said screw and said contact ring are turned said first ring is rotated in said cavity.

6. An improved potentiometer comprising, in combination:

first means, including casing means, constructed and arranged to provide an inner chamber of generally circular configuration and to provide an opening of substantially circular cross-section, the opening extending from the exterior of said casing means into communication with the inner chamber provided by the casing means;

second means, including a peripherally toothed *ring* gear [means] constructed and arranged for rotation in the chamber provided by said casing means;

third means, comprising electrical means including a resistive element disposed in the chamber provided by said casing means and having an arcuate exposed contact portion, and including electrical conductor means connected to end portions of the resistive element for electrical connection thereto;

fourth means, including screw-threaded means rotatably disposed and confined in the opening provided by said casing means and constructed and arranged for cooperative engagement with the periphery of said gear means to rotate the latter incident to rotation of the screw-threaded means;

and fifth means, comprising movable electrical contact means in contact with the arcuate contact portion of said resistive element and constructed and arranged for rotation by said gear means to contact different portions of the resistive means, said fifth means comprising conductive means for providing an electrical connection to said movable electrical contact means.

7. An improved potentiometer as defined by claim 6, said casing means comprising opposed non-conductive base and cover elements providing said chamber when assembled, and said gear means comprising a ring gear confined by said casing means to rotation about an axis of rotation substantially fixed with respect to said casing means.

8. An improved potentiometer comprising, in combination:

first means, including a housing comprising base and cover parts having when in assembled relationship, two generally spaced-apart inner faces whereby to provide a substantially enclosed internal recess of generally circular shape, the housing means further being constructed and arranged to provide an opening of substantially circular cross-section leading from the exterior of the housing to the internal recess;

second means, comprising an externally-toothed gear disposed within said recess and confined to rotation about an axis of rotation by said housing;

third means, including electrical means, said electrical means comprising an arcuate resistance element arranged in said recess and provided with electrical connections from its ends to locations outside said housing;

fourth means, comprising movable contact means connected with said toothed gear and constructed and arranged for moving electrical contact with and along said arcuate resistance element incident to rotation of said gear, and electrical connections to said contact means;

and fifth means, comprising screw-threaded means rotatably disposed in and confined in said opening and engaging said externally-toothed gear for rotation of the latter incident to rotation of the screw-threaded means, whereby rotation of said screw-threaded means causes changes of electrical resistance to be exhibited between the said electrical connections of said third means and the said electrical connections of said fourth means.

9. An improved miniature potentiometer, comprising:

first means, comprising upper and lower mating recess-defining casing members effective when assembled to provide a casing having an internal recess and gear-restricting means for restricting a gear in said recess to rotation about a given axis of rotation, and said casing further including means defining an opening leading to said recess and for confining a screw-threaded means in said opening;

second means, including a screw-threaded means rotatably mounted in and confined in said opening and disposed with at least a portion of its screw thread exposed to the interior of said recess;

third means, comprising an externally-toothed *ring* gear [means] disposed in said recess and confined to rotation about the said given axis of rotation by said gear-restricting means and with teeth thereof in engagement with the screw thread of said screw-threaded means for rotation of the gear means incident to rotation of the screw-threaded means;

fourth means, comprising a resistive element having an arcuate contact-engaging surface exposed in said recess, said fourth means including electrical connections to the ends of said resistive element and extending to the exterior of said casing;

and fifth means, including means on said gear means and comprising movable contact means including a contact and constructed and arranged for movement of said contact along and in contact with the contact-engaging surface of said resistive element, whereby as said screw-threaded means is rotated said contact is moved along said resistive element to vary the resistance exhibited between said contact and either of said connections.

10. A potentiometer as defined by claim 9, said casing including means providing at least one bearing means for said gear means.

11. A potentiometer comprising:

first means, comprising casing means constructed and arranged as a relatively thin substantially square housing comprising a base member and a second member, said casing means further being constructed and arranged to provide therein a cavity and also an opening of substantially circular cross-section extending from said cavity to the exterior of the casing means;

second means, comprising a rotatable worm means mounted in said opening for rotation therein and having a threaded portion exposed within said cavity;

third means, comprising *a* rotatable [means] *ring gear* mounted in said cavity in said casing means and engaging the threaded portion of said worm means for rotation thereby incident upon rotation of said worm means;

fourth means, comprising curved resistance element means presenting an arcuate exposed contact face in coaxial relationship with said rotatable means in said chamber, and electrical connections to end-portions of said resistance element means, said fourth means further comprising electrical return means;

and fifth means, comprising contact means constructed and arranged for rotation by said rotatable means to wipe along said exposed contact face of said resistance element means and electrically interconnect the latter and said electrical return means, whereby upon rotation of said worm means the electrical resistance exhibited between said electrical return means and one of said electrical connections is varied.

12. A potentiometer comprising, in combination:

first means, including casing means, constructed and arranged to provide a chamber of generally circular shape and further to provide an opening of substantially circular cross-section and which opening is arranged approximately tangentially with respect to a member of generally circular outline in said chamber and said opening extending from the exterior of said casing means into communication with the said chamber;

second means, comprising rotatable screw-threaded means disposed and confined in the said opening provided in said casing means with a screw-threaded portion thereof disposed in the region of tangency with the member of generally circular outline in said chamber;

third means, comprising a *ring gear* [member] of generally circular outline [and] rotatable about an axis and said [member] *ring gear* being disposed and confined in the said chamber and arranged in peripheral contact with the screw-thread of said screw-threaded means for rotation by the latter;

fourth means, comprising electrical means including a resistance element presenting an arcuate contact area and disposed in the said circular chamber, said electrical means further comprising electrical connections to respective end portions of the resistance element and also comprising electrical return means; and fifth means, comprising contact means constructed and arranged to wipe upon the arcuate contact area of said resistance element and interconnect the latter with said electrical return means, said contact means further being constructed and arranged to be moved by said third means incident to rotation of said third means by said screw-threaded means upon rotation of the latter, whereby rotation of said screw-threaded means causes wiping movement of said contact means along the arcuate contact area of said resistance element to change the value of the electrical resistance exhibited between either of said electrical connections and said electrical return means.

References Cited in the file of this patent or the original patent

UNITED STATES PATENTS

| | | |
|---|---|---|
| 586,864 | Pieper | July 20, 1897 |
| 1,602,497 | Livingston | Oct. 12, 1926 |
| 2,197,312 | Nelson | Apr. 16, 1940 |
| 2,451,241 | Rosentreter | Oct. 12, 1948 |
| 2,514,682 | Tellkamp | July 11, 1950 |
| 2,565,434 | Kocmich | Aug. 21, 1951 |
| 2,704,316 | De Bell | Mar. 15, 1955 |